US012461582B1

(12) United States Patent
Chaouat et al.

(10) Patent No.: US 12,461,582 B1
(45) Date of Patent: Nov. 4, 2025

(54) POWER STATE PREDICTION USING MACHINE LEARNING CIRCUITRY

(71) Applicant: Apple Inc., Cupertino, CA (US)

(72) Inventors: Laurent F. Chaouat, Jonestown, TX (US); Rohit Gangrade, San Jose, CA (US); Safwat Mostafa Noor, Austin, TX (US); Angel E. Socarras, Lake Mary, FL (US); Harsh Chakhaiyar, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 18/167,175

(22) Filed: Feb. 10, 2023

Related U.S. Application Data

(60) Provisional application No. 63/376,489, filed on Sep. 21, 2022.

(51) Int. Cl.
G06F 1/32 (2019.01)
G06F 1/3206 (2019.01)
G06F 1/324 (2019.01)

(52) U.S. Cl.
CPC ............ G06F 1/324 (2013.01); G06F 1/3206 (2013.01)

(58) Field of Classification Search
CPC .............................. G06F 1/324; G06F 1/3206
See application file for complete search history.

(56) References Cited

U.S. PATENT DOCUMENTS

| | | | |
|---|---|---|---|
| 11,209,886 B2 | 12/2021 | Hovis et al. | |
| 11,379,708 B2 * | 7/2022 | Idgunji | G06N 3/0418 |
| 2003/0061383 A1 * | 3/2003 | Zilka | G06F 1/3203 |
| | | | 709/245 |

(Continued)

FOREIGN PATENT DOCUMENTS

WO  WO-2016210102 A1 *  6/2016  ............ G01J 1/4204

OTHER PUBLICATIONS

Sruthi, E.R., "Understanding Random Forest", https://www.analyticsvidhya.com/blog/2021/06/understanding-random-forest/, Nov. 30, 2022.*

(Continued)

*Primary Examiner* — Jaweed A Abbaszadeh
*Assistant Examiner* — Cheri L Harrington
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to performing a corrective action in response to certain detected conditions. In disclosed embodiments, clock circuitry is configured to provide a clock signal to processor circuitry. In some embodiments, power monitor circuitry is configured to generate activity information based on activity of different portions of the processor circuitry during operation of the processor circuitry. In some embodiments, machine learning circuitry is configured to predict a future power state of the processor circuitry based on inputs that include the activity information. In some embodiments, control circuitry is configured to, in response to the machine learning circuitry predicting a power state of the processor that falls within a set of one or more target predicted power states, control the clock circuitry to reduce the frequency of the clock signal provided to the processor circuitry.

19 Claims, 11 Drawing Sheets

(56) References Cited

U.S. PATENT DOCUMENTS

| | | | |
|---|---|---|---|
| 2013/0124885 A1* | 5/2013 | Davis | G06F 1/325 |
| | | | 713/320 |
| 2016/0231798 A1* | 8/2016 | Gendler | G06F 1/3206 |
| 2016/0239074 A1* | 8/2016 | Lee | G06F 1/3275 |
| 2017/0147058 A1* | 5/2017 | Bertran | G06F 1/3296 |
| 2017/0329391 A1* | 11/2017 | Jaffari | G06F 1/28 |
| 2018/0284868 A1* | 10/2018 | Koker | G06T 1/20 |
| 2019/0310698 A1* | 10/2019 | Mehra | G06F 1/329 |
| 2021/0081016 A1* | 3/2021 | Hovis | G06F 1/3206 |
| 2021/0116982 A1* | 4/2021 | Khanna | G06F 1/3287 |
| 2021/0255799 A1* | 8/2021 | Kale | G06N 3/049 |
| 2021/0303045 A1* | 9/2021 | Leung | G06F 1/3228 |
| 2022/0358382 A1* | 11/2022 | Gotesdyner | H04L 67/125 |
| 2023/0195197 A1* | 6/2023 | Mousazadeh | G06F 1/3293 |
| | | | 713/320 |
| 2024/0004725 A1* | 1/2024 | Jain | G06F 9/5038 |
| 2024/0085971 A1* | 3/2024 | Cao | G06F 1/189 |

OTHER PUBLICATIONS

Kostadinov, Simeon, "Understanding Backpropagation Algorithm", Towards Data Science, https://towardsdatascience.com/understanding-backpropagation-algorithm-7bb3aa2f95fd, Aug. 8, 2019.*

Zhang et al, "Dive into Deep Learning" https://web.archive.org/web/20220609063343/https://d2l.ai/chapter_recurrent-modern/index.html, Jun. 9, 2022.*

* cited by examiner

US 12,461,582 B1

POWER STATE PREDICTION USING MACHINE LEARNING CIRCUITRY

This Application claims priority to U.S. Prov. Appl. No. 63/376,489, filed Sep. 21, 2022, which is hereby incorporated by reference in its entirety.

BACKGROUND

Technical Field

This disclosure relates generally to power management for processor circuits and more particularly to performing a corrective action in response to certain detected conditions.

Description of the Related Art

Computing devices sometimes operate with high current loads, e.g., when multiple components are working at the same time. When a large current demand occurs, a significant drop in supply voltage may occur, potentially causing a supply voltage undershoot, also referred to as droop. Supply voltage droop may cause logic errors, e.g., in processor pipeline circuitry. To avoid such situations, traditional techniques may over-margin supply voltage for a given design, for example, which may have negative effects on overall performance and power consumption.

DETAILED DESCRIPTION

As briefly discussed above, a significant drop in supply voltage may occur in conjunction with a large current demand, e.g., when multiple components are powered on at the same time. U.S. patent application Ser. No. 15/419,218, filed on Jan. 30, 2017 discusses techniques for mitigating effects of supply voltage droops in a system on a chip, e.g., by downshifting clock frequency to avoid logic errors. The present disclosure provides techniques that may have improved latency in detecting supply voltage events, improved accuracy in detecting supply voltage events, or both, relative to the '218 application. Generally, detecting supply voltage events earlier may improve the ability for corrective action and improved accuracy may avoid negative impacts of un-detected voltage droop, reduce impacts of taking corrective action for false positives, or both.

In some embodiments, discussed in detail below, machine learning circuitry predicts a future power state of the processor circuitry based on various inputs, including a set of power characteristics (e.g., as measured by counter circuitry of a digital power estimator based on activity of various processor components). As one example, the machine learning circuitry may implement a decision tree generated using random forest training techniques. In disclosed embodiments, control circuitry may control the frequency of the clock signal provided to processor circuitry based on outputs of the machine learning circuitry.

In some embodiments, control circuitry is configured to, in response to predicting a future power state that meets a threshold rate-of-change of electrical current (dI/dt), reduce the frequency of the clock signal provided to the processor circuitry.

Graphics Processing Overview

Figure 1A:
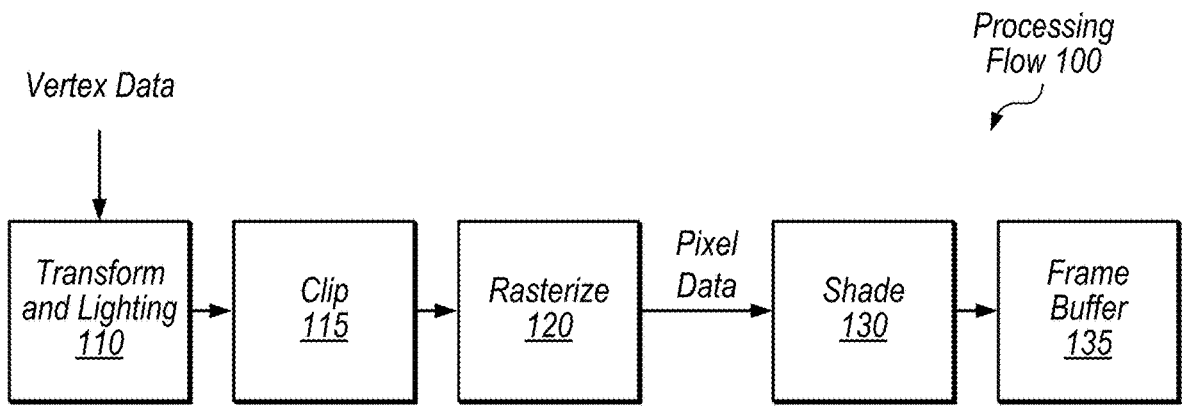
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
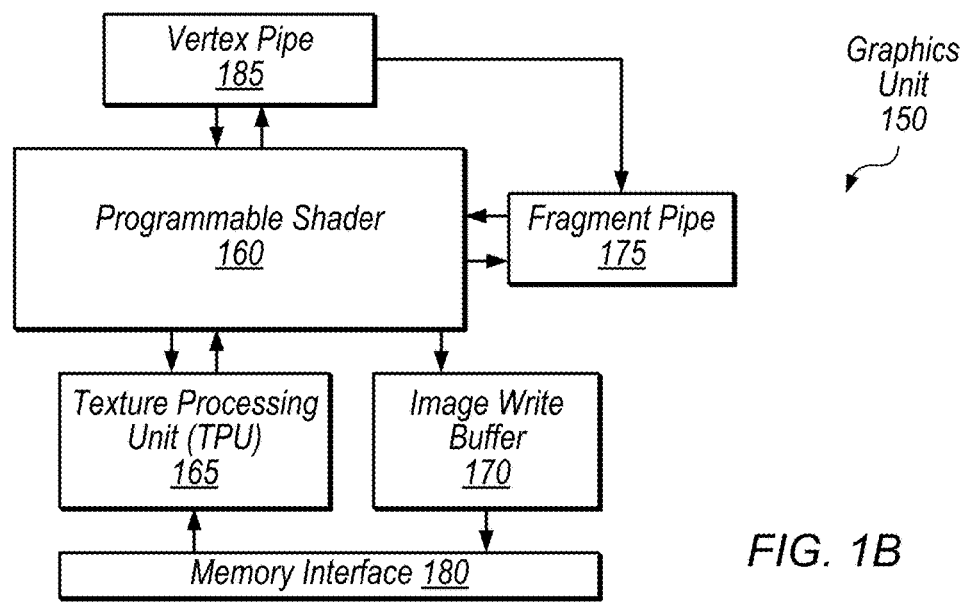
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Power Event Detection

Figure 2:
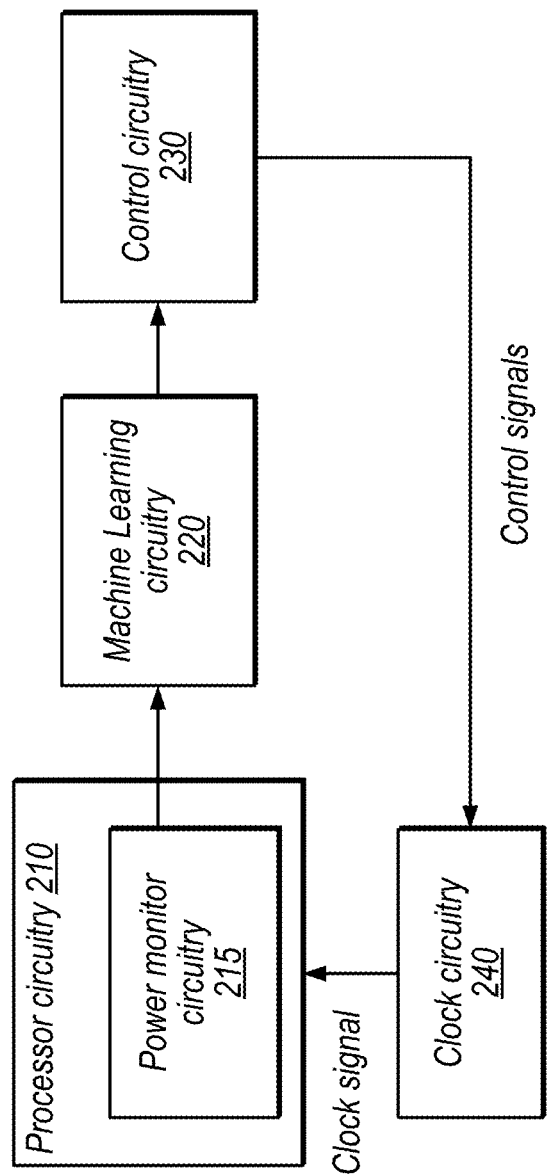
FIG. 2 is a diagram illustrating an overview of example circuitry configured to predict power states, according to some embodiments.

FIG. 2 is a block diagram illustrating an overview of example circuitry configured to predict power states, according to some embodiments. In the illustrated embodiment, a device includes processor circuitry 210, machine learning circuitry 220, control circuitry 230, and clock circuitry 240. Processor circuitry 210, in turn, includes power monitor circuitry 215.

Processor circuitry 210, in some embodiments, is configured to perform a wide variety of operations including but not limited to: process and execute instructions, perform graphics operations, etc. In some embodiments, processor circuitry 210 may be or may include a central processing unit, a graphics processing unit, a machine learning accelerator, a system on a chip, etc. Processor circuitry 210 may include a number of sub-units whose power state may be independently controlled (e.g., to clock gate or power gate sub-units that are not currently in use).

In some embodiments, processor circuitry 210 performs operations based on a clock signal with a particular frequency generated and provided by clock circuitry 240.

Power monitor circuitry 215, in the illustrated embodiment, is configured to generate activity information based on activity of different portions of processor circuitry 210 during operation of circuitry 210. In some embodiments, to generate the activity information, power monitor circuitry 215 accumulates digital power event measurements over multiple clock cycles, as discussed in further detail below with respect to FIG. 3. In some embodiments, power monitor circuitry 215 performs estimations to generate the activity information.

Machine learning circuitry 220, in the illustrated embodiment, is configured to predict a future power state of processor circuitry 210 based on inputs that include the activity information generated by power monitor circuitry 215. In some embodiments, machine learning circuitry 220 implements a multi-level decision structure (e.g., decision tree, neural network, etc.) to predict the future power state of processor circuitry 210, as discussed in further detail below with respect to FIG. 4.

As used herein, the phrase "predict a future power state" refers to a power state of the processor circuitry that is anticipated to occur in the future but has not yet occurred. This is in contrast to reactive measures taken in response to detecting a current power state (which have inherent latency drawbacks). Rather, predicting a future power state may allow preemptive actions to prevent or mitigate the predicted future power state.

In some embodiments, the predicted future power state may be one of many different power states. For example, the many different power states may include a power-saving power state, high-performance power state, etc. The predicted future power state may be a power state that meets a threshold rate-of-change of electrical current, for example.

In some embodiments, machine learning circuitry 220 implements multiple different multi-level decision structures (e.g., multiple different decision trees) and selects a multi-level decision structure from the multiple different multi-level decision structures to predict future power states.

Clock circuitry 240, in the illustrated embodiment, is configured to generate a clock signal and provide the clock signal to processor circuitry 210. In some embodiments, clock circuitry 240 receives control signals from control circuitry 230 that control the frequency of the clock signal to be provided to processor circuitry 210.

As used herein, the terms "clock" and "clock signal" refer to a periodic signal, e.g., as in a two-valued (binary) electrical signal. A clock periodically changes between "levels" of the clock such as voltage ranges of an electrical signal. For example, voltages greater than 0.7 volts may be used to represent one clock level and voltages lower than 0.3 volts may be used to represent another level in a binary configuration. As used herein, the term "clock edge" refers to a change in a clock signal from one level to another level. As used herein, the term "toggle" in the context of a clock signal refers to changing the value of the clock signal from one level to another level in a binary clock configuration. As used herein, the term clock "pulse" refers to an interval of a clock signal between consecutive edges of the clock signal (e.g., an interval between a rising edge and a falling edge or an interval between a falling edge and a rising edge). Note that sequential circuitry may perform operations on a rising edge of a clock signal, a falling edge of a clock signal, or both (which may be referred to as dual-edge triggered).

Control circuitry 230, in the illustrated embodiment, is configured to, in response to machine learning circuitry 220 predicting a future power state of processor circuitry 210 that falls within a set of target predicted power states, issue control signals to clock circuitry 240 to reduce the frequency of the clock signal provided to processor circuitry 210. The reduction may be temporary (e.g., with the amount and duration of the reduction depending on the predicted power state).

Note that those skilled in the art will realize reducing the frequency of the clock signal is equivalent to increasing the period of the clock signal. Thus, circumstances in which clock circuitry 240 reduces the frequency of the clock signal can be equivalently described as clock circuitry 240 increasing the period of the clock signal, and vice versa.

Detailed Power Event Detection Circuitry

Figure 3:
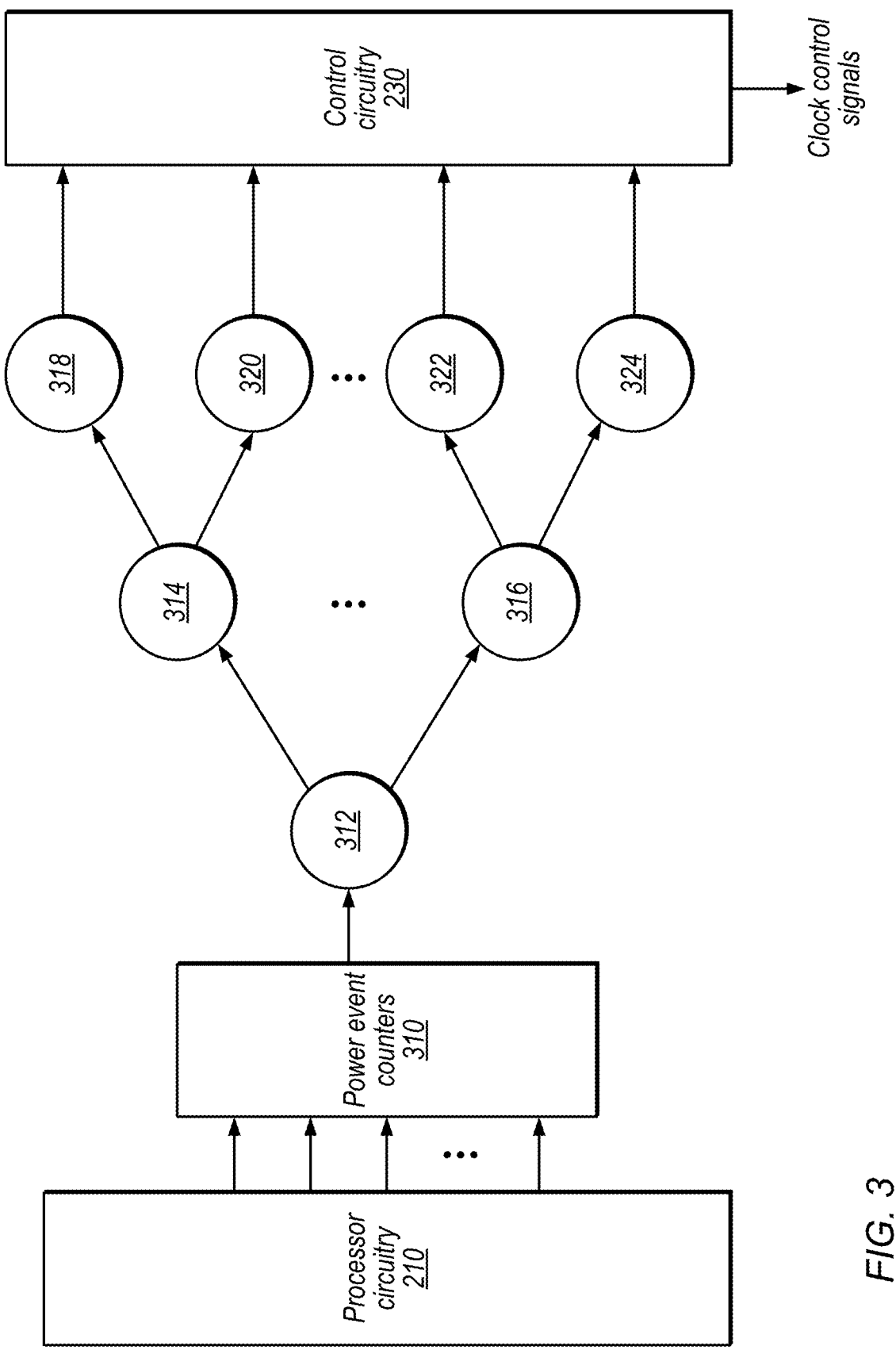
FIG. 3 is a block diagram illustrating detailed example circuitry configured to predict power states, according to some embodiments.

FIG. 3 is a block diagram illustrating detailed circuitry configured to predict power states, according to some embodiments. In the illustrated embodiment, a device includes processor circuitry 210, power event counters 310, nodes 312-324, and control circuitry 230.

Processor circuitry 210, in the illustrated embodiment, may be configured as described above with respect to FIG. 2. In addition, in the illustrated embodiment, processor circuitry 210 reports, from multiple different portions of processor circuitry 210, digital power event measurements to power event counters 310.

Power event counters 310, in the illustrated embodiment, are configured to accumulate digital power event measurements over multiple clock cycles. In some embodiments, digital power event measurements may include various types of measurements recorded from the various portions of processor circuitry 210. For example, the digital power event measurements may include measurements from ray tracing circuit activity, sampling circuit activity, arithmetic logic unit activity, branch prediction circuit activity, etc. Note that different events may be sampled at different rates and counters may increment by different amounts for different events. Note that the provided examples are not intended to limit the scope of this disclosure, and various other types of digital power event measurements may be accumulated by power event counters 310.

Nodes 312-324, in the illustrated embodiment, are organized in a multi-level structure and are configured to provide output information (e.g., for a neural network), path information (e.g., for a decision tree), or both for subsequent nodes based on activity information provided as input. In the illustrated embodiment, nodes 312-324 form three layers (e.g., node 312 in a first layer, nodes 314 and 316 in a second layer, and nodes 318-324 in a third layer). Note that seven nodes and three layers are shown for purposes of illustration, but various other numbers of layers, connectivity structures between layers, and numbers of nodes per layer may be implemented.

In some embodiments, the last layer (e.g., nodes 318-324) of the multi-level decision structure is a decision layer. In some embodiments, the decision layer outputs values to control circuitry 230. For example, in some embodiments, the outputs of nodes 318-324 may be a binary format (e.g., 1 or 0) that indicate whether a particular node fires (e.g., indicates for control circuitry 230 to issue clock control signals to reduce the frequency of the clock signal). In these embodiments, a given node firing may correspond to a particular predicted power state in the set of target power states. In some embodiments, a given node of the decision layer corresponds to an amount of reduction of the frequency of the clock signal.

Control circuitry 230, in the illustrated embodiment, is configured to issue clock control signals to clock circuitry (not shown) based on values received from nodes 318-324.

In some embodiments, control circuitry 230 is configured to categorize a user of the device according to their power usage profile falling within one of multiple power usage profiles. In some embodiments, machine learning circuitry selects the multi-level decision structure from the multiple different multi-level decision structures based on the categorization.

Detailed Machine Learning Circuitry Configured to Predict Power States

Figure 4:
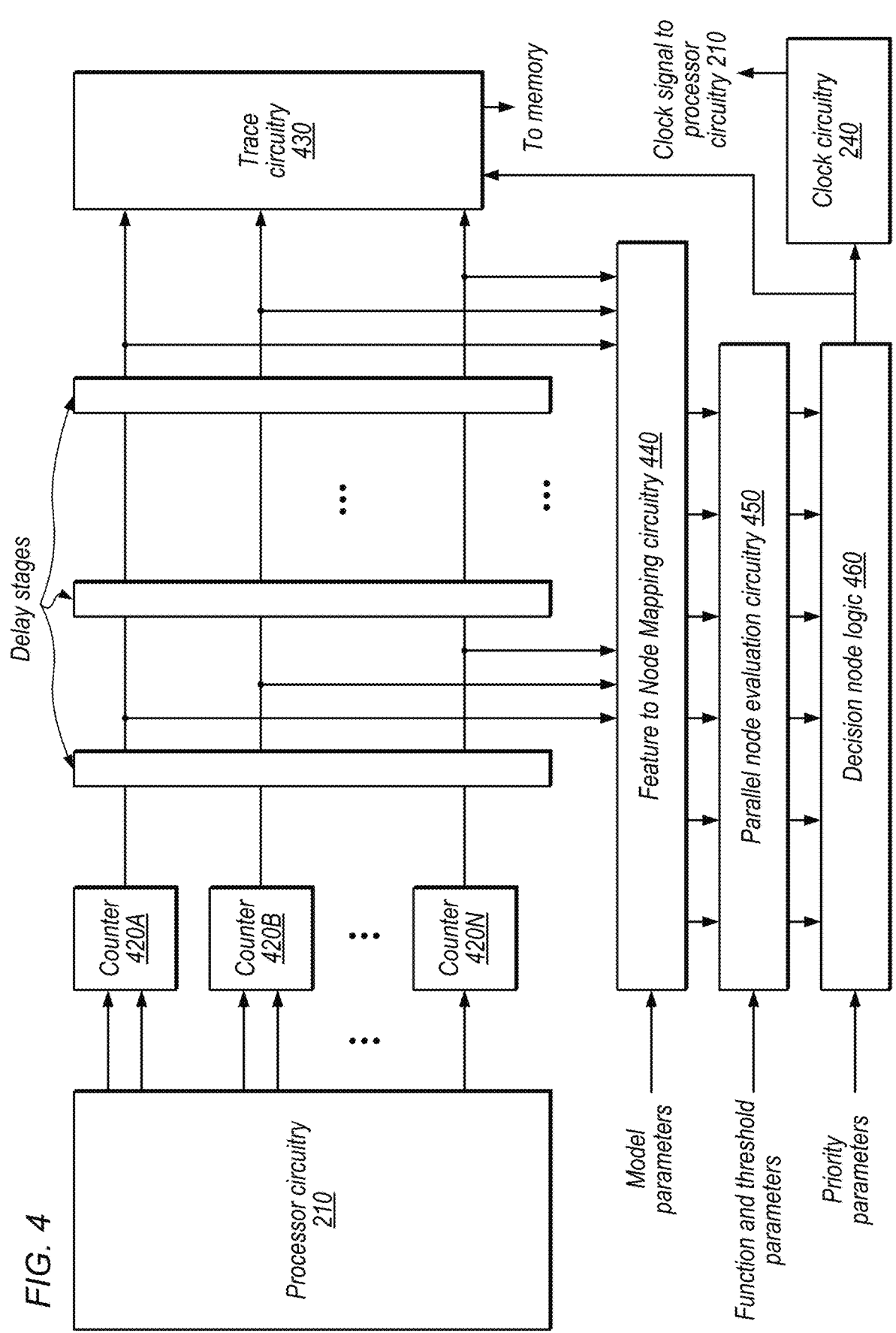
FIG. 4 is a block diagram illustrating detailed example machine learning circuitry configured to predict power states, according to some embodiments.

FIG. 4 is a block diagram illustrating detailed machine learning circuitry configured to predict power states, according to some embodiments. In the illustrated embodiment, a device includes processor circuitry 210, counters 420A-420N, trace circuitry 430, feature to node mapping circuitry 440, parallel node evaluation circuitry 450, decision node logic 460, and clock circuitry 240. Processor circuitry 210 may be configured as described above with respect to FIG. 2.

Counters 420A-420N, in the illustrated embodiment, are configured to accumulate digital power event measurements. In some embodiments, each of counters 420A-420N accumulate common events. As processors become more distributed, e.g., with multiple replicated units in a GPU, a given counter may accumulate common events from multiple processor sub-units. For example, counter 420A may accumulate all measurements for digital power events relating to ray tracing circuit activity while counter 420B may accumulate all measurements for digital power events relating to sampling circuit activity.

In the illustrated embodiment, accumulated digital power events may propagate through multiple delay stages (e.g., which may be implemented using flip-flops) in order to track differences between counter values over time. In some embodiments, counter values at different points in time (e.g., different delay stages) propagate to feature to node mapping circuitry 440. For example, as illustrated in FIG. 4, counter values measured between the first and second delay stages (indicated by the first set of three consecutive lines) and counter values measured after the last delay stage (indicated by the second set of three consecutive lines) propagate to circuitry 440. Note that any appropriate number of delay stages may be used and may be tapped at various points between stages.

Trace circuitry 430, in the illustrated embodiment, is configured to store differences between counter values over time as generated in the multiple delay stages. In some embodiments, trace circuitry 430 is also configured to store node decisions made by decision node logic 460. In some embodiments, trace circuitry 430 is configured to transfer all or a portion of its stored data to memory (e.g., using direct memory access (DMA) circuitry), as illustrated, which may be used for training or debug purposes, for example.

Feature to node mapping circuitry 440, in the illustrated embodiment, is configured to, based on received model parameters, map features of activity information to nodes in a multi-level decision structure. In some embodiments, the model parameters include parameters that define a machine learning model. For example, the model parameters may include the number of levels in the multi-level decision structure, the number of nodes in each level of the structure, the type of power event measurement(s) input to each respective node, etc. In some embodiments, the feature to node mapping is programmable, e.g., by programming configuration registers with various parameters discussed above. In some embodiments, feature to node mapping circuitry 440 may be implemented as a partial or full crossbar.

Parallel node evaluation circuitry 450, in the illustrated embodiment, is configured to evaluate, based on function and threshold parameters, nodes at multiple different levels in the multi-level decision structure in parallel. In some embodiments, this includes evaluating whether a particular feature of activity information meets a threshold according to a function for a node. Non-limiting examples of functions that may be assigned to a given a node include: greater than, greater than or equal to, less than, less than or equal to, equal to, not equal to, etc.

Note that parallel node evaluation for multiple levels of the decision structure may facilitate rapid predictions (e.g., relative to sequentially evaluating levels of the structure) which may advantageously reduce or avoid missed current spikes, for example.

As one example, a particular node in the multi-level decision structure may have a corresponding node function greater than or equal to, and a corresponding threshold of five. In this example, for a delta in the corresponding counter values (e.g., based on ray tracing activity) that is greater than or equal to five, the node evaluates true and a corresponding path in a decision tree is chosen. Further, still in this example, for a node in the decision layer of the multi-level decision structure, for a corresponding counter delta that meets the threshold for the function, the node fires and indicates to control the frequency of the clock signal provided by clock circuitry 240. In some embodiments, node function and threshold parameters are programmable, e.g., by programming configuration registers with various parameters discussed above. In some embodiments, the nodes in the multi-level decision structure and their corresponding functions may be implemented as a set of programmable comparator circuits. In this example, the set of programmable comparator circuits receive node function controls and threshold parameters from programmable registers.

Decision node logic 460, in the illustrated embodiment, is configured to, based on provided priority parameters, select a node decision from the decision layer of the multi-level decision structure in cases where multiple nodes in the decision layer predict a power state that falls within the set of target predicted power states. In such situations, priority parameters provide priority information to decision node logic 460 for selection of which node should control the corrective action by clock circuitry 240. In some embodiments, decision node logic 460 implements and handles priority using multiplexer circuitry.

Note that parallel node evaluation circuitry 450 may evaluate some nodes that are not relevant, e.g., due to a prior node in a decision tree traversing in a different direction. Decision node logic 460 may therefore determine which decision node outputs are actually relevant based on outputs of prior nodes in the structure.

For example, in some embodiments, a given node of the decision layer corresponds to an amount of reduction of the frequency of the clock signal. Generally, the node with the highest priority may control the corrective action. For example, in response to both a first node with a first priority and a second node with a second priority predicting a power state of the processor that falls within the set of target predicted power states, clock circuitry 240 may reduce the frequency of the clock signal according to a node having a greater priority of the first and second nodes.

For example, the first node with the first priority (e.g., node 318 of FIG. 3) and the second node with a second, lower priority (e.g., node 320 of FIG. 3) may both fire based on provided activity information, evaluated node functions, and threshold parameters. In this example, decision node logic 460 selects the first node decision based on the indicated priority information, and issues control signals to clock circuitry 240 based on the first node decision. In some embodiments, the priority information for nodes in the decision layer provided by the priority parameters is programmable.

Clock circuitry 240, in the illustrated embodiment, is configured to, based on a node decision selected by decision node logic 460, control characteristics of a clock signal to processor circuitry 210.

In some embodiments, the node decision selected by decision node logic 460 may cause clock circuitry 240 to reduce the frequency of the clock signal provided to processor circuitry 210. Similarly, in some embodiments, the node decision selected by decision node logic 460 may cause clock circuitry 240 to increase the frequency of the clock signal provided to processor circuitry 210 or provide an unadjusted clock signal to processor circuitry 210.

Overview of Example Training System

Figure 5:
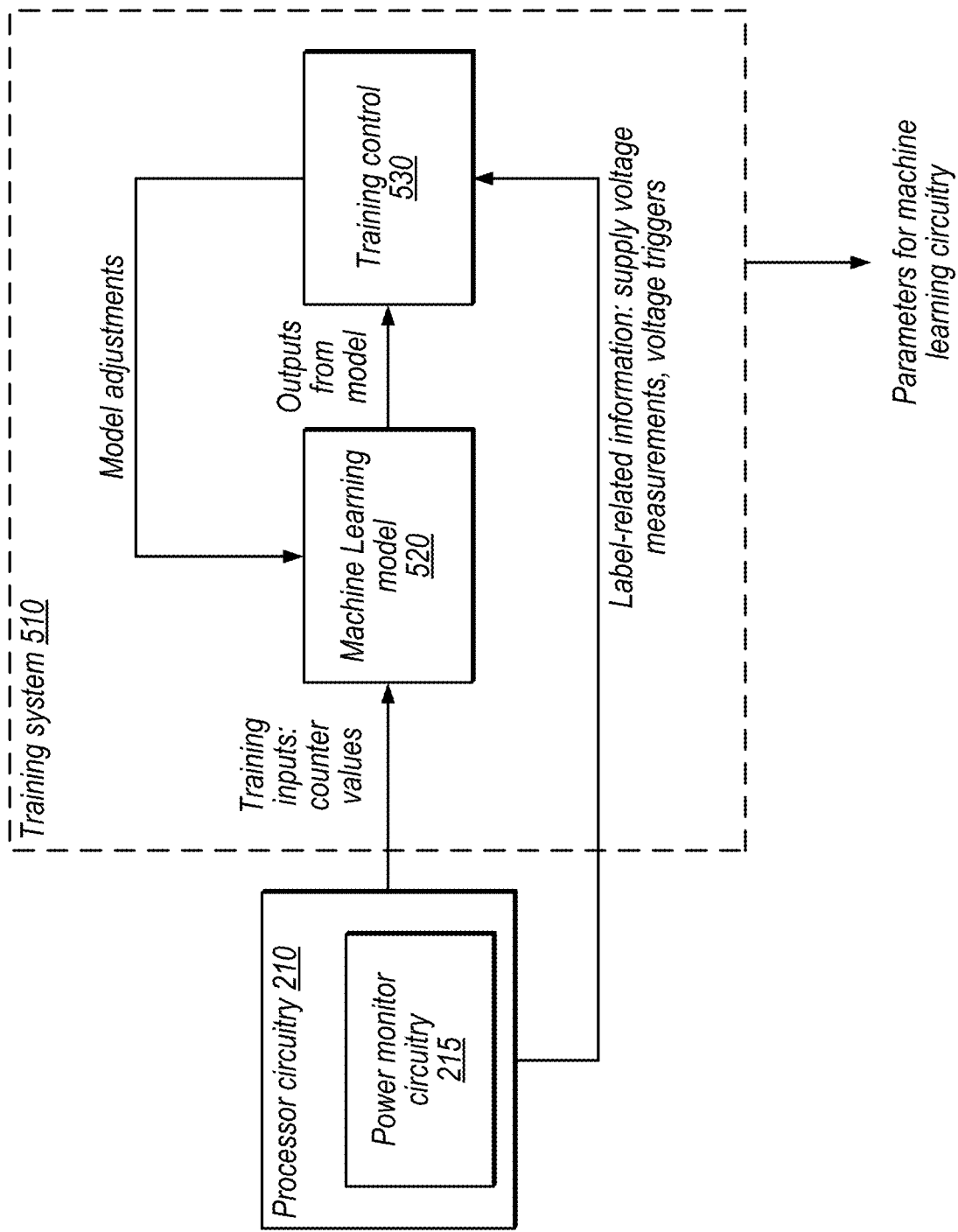
FIG. 5 is a block diagram illustrating an example training system, according to some embodiments.

FIG. 5 is a block diagram illustrating an example training system, according to some embodiments. In the illustrated embodiment, a device includes processor circuitry 210 and training system 510. Processor circuitry 210, in turn, includes power monitor circuitry 215. Training system 510, in turn, includes machine learning model 520 and training control 530.

Speaking generally, training system 510 may be configured to generate a machine learning model based on operations of a post-silicon version of processor circuitry 210 (which may or may not be included in a production-ready computing device). For example, training system 510 may include testbench circuitry configured to measure supply voltage at one or more rails of processor circuitry 210 and retrieve counter values from a memory corresponding to processor circuitry 210 (e.g., as generated by trace circuitry 430). Training system 510 may train a model that may be used to program various production computing devices that incorporate processor circuitry 210. In some embodiments, background training of the various production computing devices may be performed in the field (e.g., once a device has been sold to an entity and is being used by the entity).

Processor circuitry 210, in the illustrated embodiment, is configured in a similar manner as described above with respect to FIG. 2. Power monitor circuitry 215 may also be configured as described above. In the illustrated embodiment, processor circuitry 210 is configured to provide, to machine learning model 520, training inputs (e.g., counter values from power monitor circuitry 215) based on accumulated digital power event measurements.

Training system 510, in the illustrated embodiment, is configured to output parameters for machine learning circuitry (e.g., to configure machine learning circuitry 220 in production devices). In some embodiments, training system 510 generates and trains machine learning model 520.

In some embodiments, training system 510 generates one or more multi-level decision structures as part of a machine learning classification operation (e.g., random forest classification). System 510 may generate the one or more multi-level decision structures in both an online (e.g., provided by a server or remote computing system) and offline (e.g., stored in a memory of the training system) context. In some situations, when the one or more multi-level decision structures are unable to be generated (e.g., connection lost to an online server, insufficient training data, etc.) training systems reverts to using a default multi-level decision structure. In the illustrated embodiment, machine learning model 520 may be any type of model that incorporates a multi-level decision structure (e.g., decision tree, neural network, etc.). For example, machine learning model 520 may be one of the one or more multi-level decision trees generated by training system 510 as part of a random forest classification.

In some embodiments, processor circuitry 210 is configured to provide, to training control 530, label-related information for training. In some embodiments, the label-related information includes supply voltage measurements. In some embodiments, the label-related information includes trigger information, e.g., indicating whether supply voltage measurements meet certain thresholds. Various triggers may be implemented based on supply voltage measurements over time, multi-aspect triggers, etc.

In some embodiments, machine learning model 520 generates outputs, based on the training inputs, and provides the outputs to training control 530. In the illustrated embodiment, training control 530 is configured to generate model adjustments for machine learning model 520, e.g., based on differences between the model outputs and the supply voltage measurements. Training system 510 may iteratively adjust the model until a target level of accuracy in predicting a set of target power states is achieved.

In some embodiments, the model adjustments may include training control 530 choosing model 520 to be the best performing decision structure from among the one or more multi-level decision structures generated by training system 510. In some embodiments, in addition to choosing the best performing decision structure, training control may also adjust the number of layers in the multi-level decision structure, the number of nodes in each layer of the structure, the functions for each node, the threshold values of model 520, node weights in neural-network implementations, etc.

Example Methods

Figure 6:
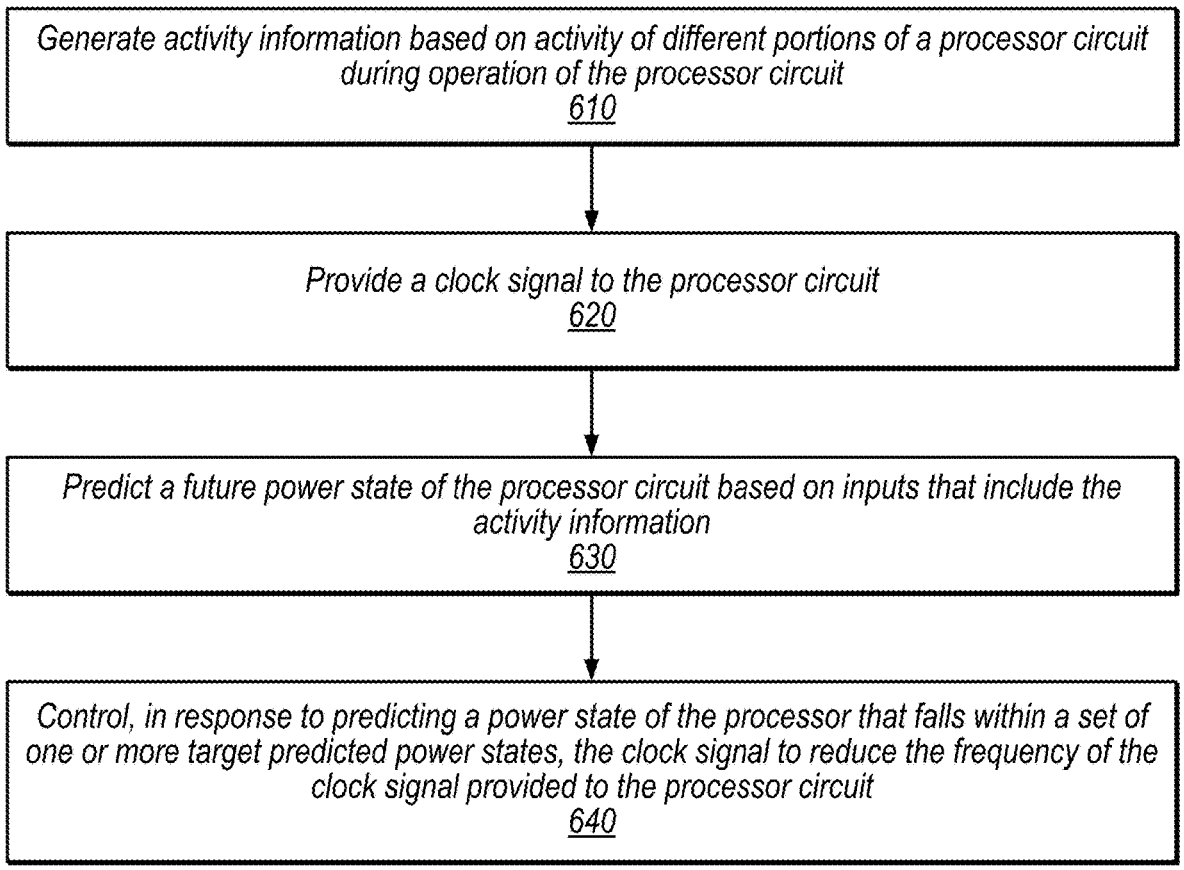
FIGS. 6-7 are flow diagrams illustrating example methods, according to some embodiments.

FIG. 6 is a flow diagram illustrating an example method for power event detection using machine learning, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing device (e.g., power monitor circuitry) generates activity information based on activity of different portions of a processor circuit during operation of the processor circuit.

In some embodiments, power monitor circuitry accumulates power event measurements over multiple clock cycles to generate the activity information based on activity of different portions of the processor circuit.

In some embodiments, the power event measurements include measurements from two or more of the following events: ray tracing circuit activity, sampling circuitry activity, branch prediction circuit activity, and arithmetic logic unit activity.

At 620, in the illustrated embodiment, the computing device (e.g., clock circuitry) provides a clock signal to the processor circuit.

At 630, in the illustrated embodiment, the computing device (e.g., machine learning circuitry) predicts a future power state of the processor circuit based on inputs that include the activity information.

In some embodiments, machine learning circuitry implements a multi-level decision structure that includes one or more nodes at multiple different levels. In some embodiments, the machine learning circuitry includes node evaluation circuitry that processes nodes from multiple different levels in parallel.

In some embodiments, machine learning circuitry implements multiple different decision trees and selects a decision tree from the multiple different decision tress to predict the future power state.

In some embodiments, machine learning circuitry determines differences between accumulated power event measurements at multiple different points in time to predict a future power state of the processor circuit.

In some embodiments, machine learning circuitry predicts the future power state of the processor circuit based on machine learning parameters, including one or more node functions and one or more node thresholds, stored in programmable circuitry.

In some embodiments, machine learning circuitry maps features of the activity information to nodes in the multi-level decision structure. In some embodiments, the feature to node mapping is stored in programmable circuitry.

At 640, in the illustrated embodiment, the computing device (e.g., control circuitry) controls, in response to predicting a power state of the processor that falls within a set of one or more target predicted power states, the clock signal to reduce the frequency of the clock signal provided to the processor circuit.

In some embodiments, the set of one or more target predicted power states includes a state that meets a threshold rate-of-change of electrical current.

In some embodiments, control circuitry categorizes a user according to their power usage profile matching, to within a threshold degree, one of multiple power usage profiles. In some embodiments, selection of the decision tree from the multiple different decision trees is based on the categorization.

In some embodiments, the multi-level decision structure includes a decision layer and specifies priority information for nodes in the decision layer. In some embodiments, a given node of the decision layer corresponds to an amount of reduction of the frequency of the clock signal.

In some embodiments, control circuitry, in response to both a first node with a first priority and a second node with a second priority predicting a power state of the processor that falls within the set of target predicted power states, reduces the frequency of the clock signal according to a node having a greater priority of the first and second nodes.

In some embodiments, the priority information for nodes in the decision layer is stored in programmable circuitry.

Figure 7:
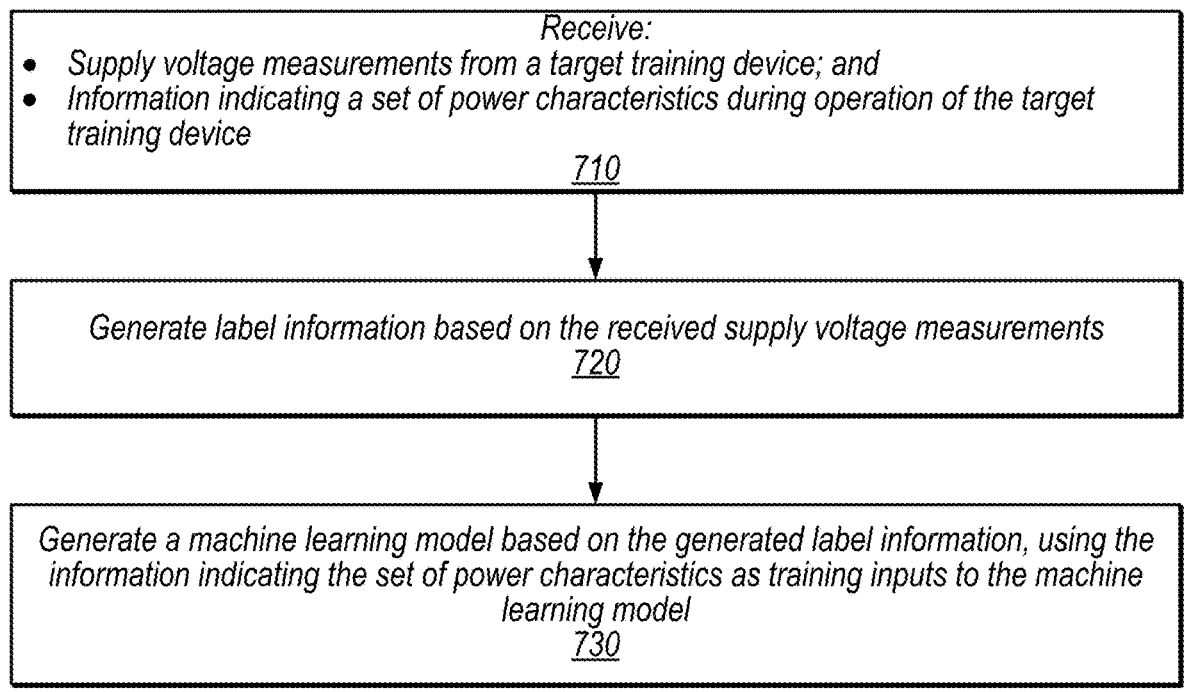

FIG. 7 is a flow diagram illustrating an example method for training machine learning circuitry, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a training computing system receives supply voltage measurements from a target training device and information indicating a set of power characteristics during operation of the target training device.

At 720, in the illustrated embodiment, the training computing system generates label information based on the received supply voltage measurements.

At 730, in the illustrated embodiment, the training computing system generates a machine learning model based on the generated label information, using the information indicating the set of power characteristics as training inputs to the machine learning model.

In some embodiments, the training computing system determines parameters for configured a machine learning circuit that implement the machine learning model.

In some embodiments, the machine learning model is a multi-level decision structure (e.g., neural network, decision tree, etc.) with multiple different levels where each level has a corresponding number of nodes. For example, the machine learning model may be generated using random forest techniques.

Other Example Mitigation Techniques

Figure 8:
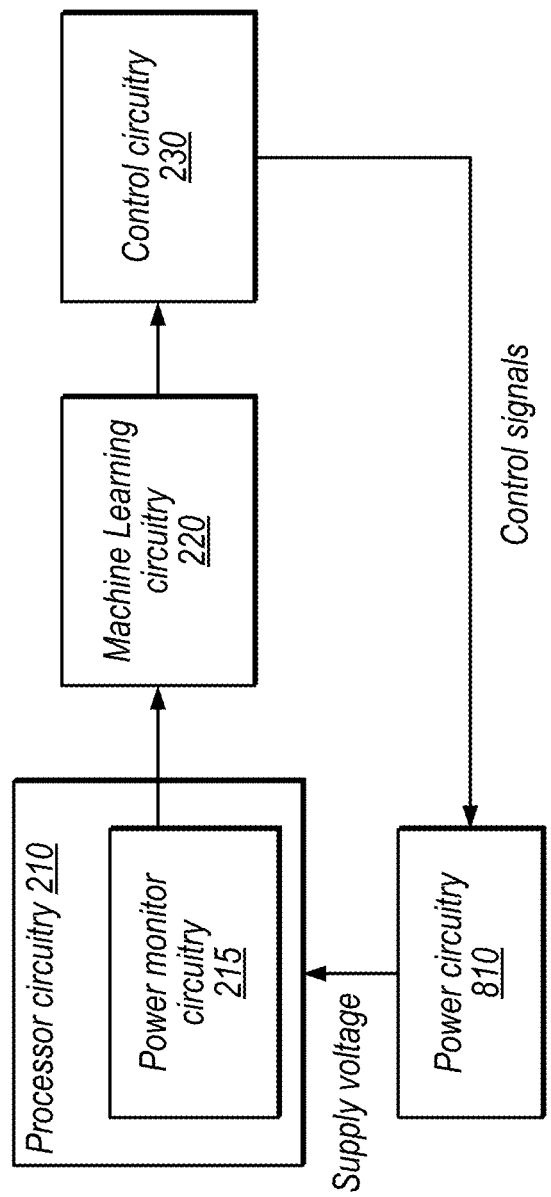
FIG. 8 is a diagram illustrating an alternative overview of example circuitry configured to predict power states, according to some embodiments.

FIG. 8 is a diagram illustrating an alternative overview of example circuitry configured to predict power states, according to some embodiments. In the illustrated embodiment, a device includes processor circuitry 210, machine learning circuitry 220, control circuitry 230, and power circuitry 810. Processor circuitry 210, in turn, includes power monitor circuitry 215.

Processor circuitry 210, power monitor circuitry 215, machine learning circuitry 220, and control circuitry 230, in some embodiments, are configured to perform the same functions as described above with respect to FIG. 2.

In the illustrated embodiment, processor circuitry 210 performs operations based on a supply voltage generated and provided by power circuitry 810. In some embodiments, processor circuitry 210 performs operations based on a clock signal with a particular frequency generated and provided by clock circuitry (not shown).

Power circuitry 810, in the illustrated embodiment, is configured to generate and provide a supply voltage to processor circuitry 210. In some embodiments, power circuitry 810 receives control signals from control circuitry 230 that control the supply voltage to be provided to processor circuitry 210. In some situations, the controls signals may trigger a voltage droop mitigation response by power circuitry 810, which may include circuitry 810 utilizing a charge-pump to increase the supply voltage provided to processor circuitry 210. This may predict or mitigate voltage droop. In other embodiments, any of various auxiliary power techniques may be used to increase supply voltage in response to a predicted voltage droop (or otherwise adjust provided supply voltage based on various predicted scenarios).

In some embodiments, the processor may adjust both supply voltage and clock frequency based on a predicted future power state.

Example Device

Figure 9:
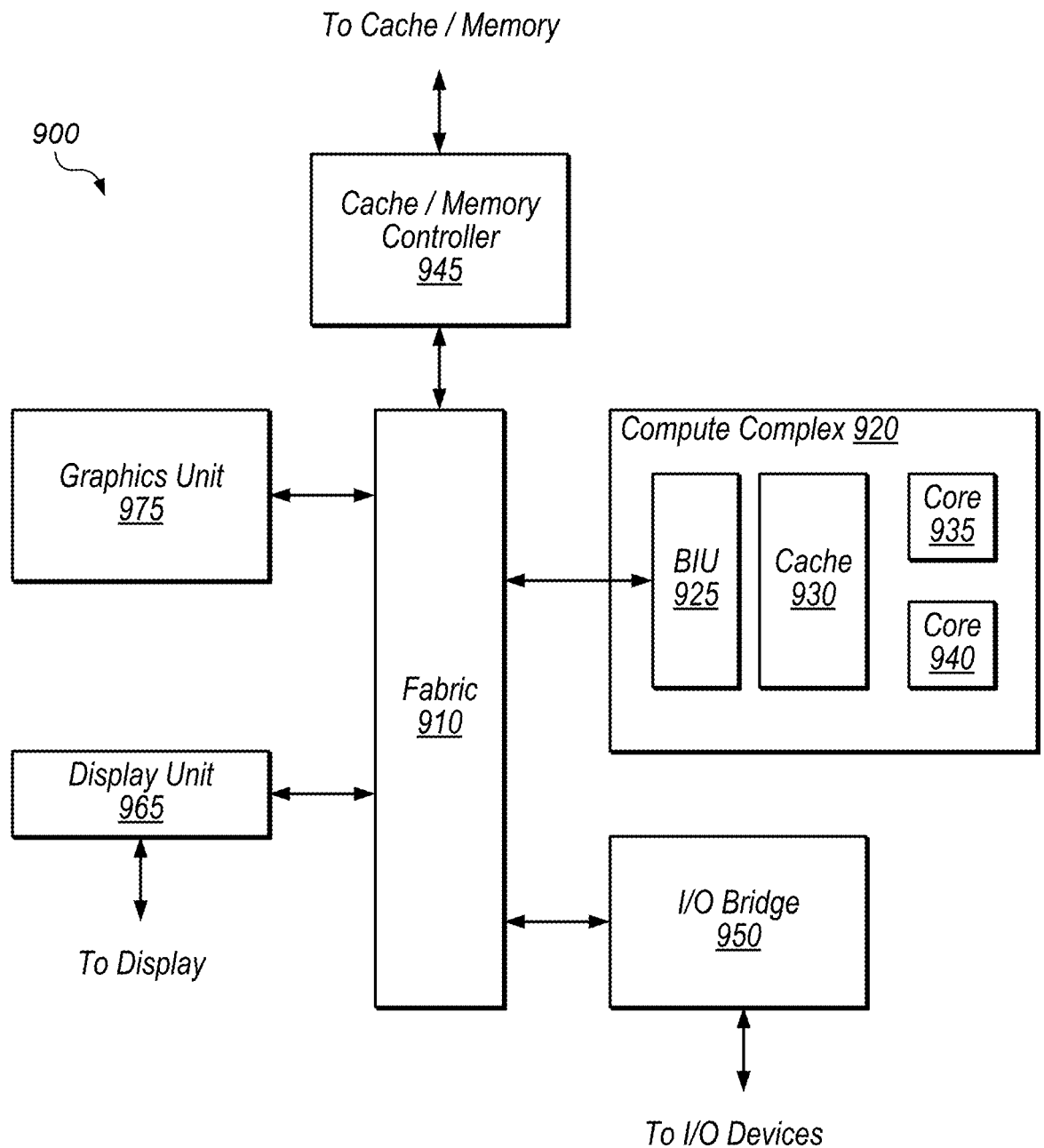
FIG. 9 is a block diagram illustrating an example computing device, according to some embodiments.

Referring now to FIG. 9, a block diagram illustrating an example embodiment of a device 900 is shown. In some embodiments, elements of device 900 may be included within a system on a chip. In some embodiments, device 900 may be included in a mobile device, which may be battery-powered. Therefore, power consumption by device 900 may be an important design consideration. In the illustrated embodiment, device 900 includes fabric 910, compute complex 920 input/output (I/O) bridge 950, cache/memory controller 945, graphics unit 975, and display unit 965. In some embodiments, device 900 may include other components (not shown) in addition to or in place of the illustrated components, such as video processor encoders and decoders, image processing or recognition elements, computer vision elements, etc.

In some embodiments, device 900 includes control circuitry configured to perform the power state prediction and corrective action techniques discussed above, e.g., at the SoC level. These techniques may be performed in addition to or in place of individual components utilized disclosed techniques.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches.

In some embodiments, compute complex 920 is configured to perform the power state prediction and corrective action techniques discussed above.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Graphics unit 975 may include one or more processors, e.g., one or more graphics processing units (GPU's). Graphics unit 975 may receive graphics-oriented instructions, such as OPENGL®, Metal, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 975 is configured to perform the power state prediction and corrective action techniques discussed above.

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 900 with connectivity to various types of other devices and networks.

Example Applications

Figure 10:
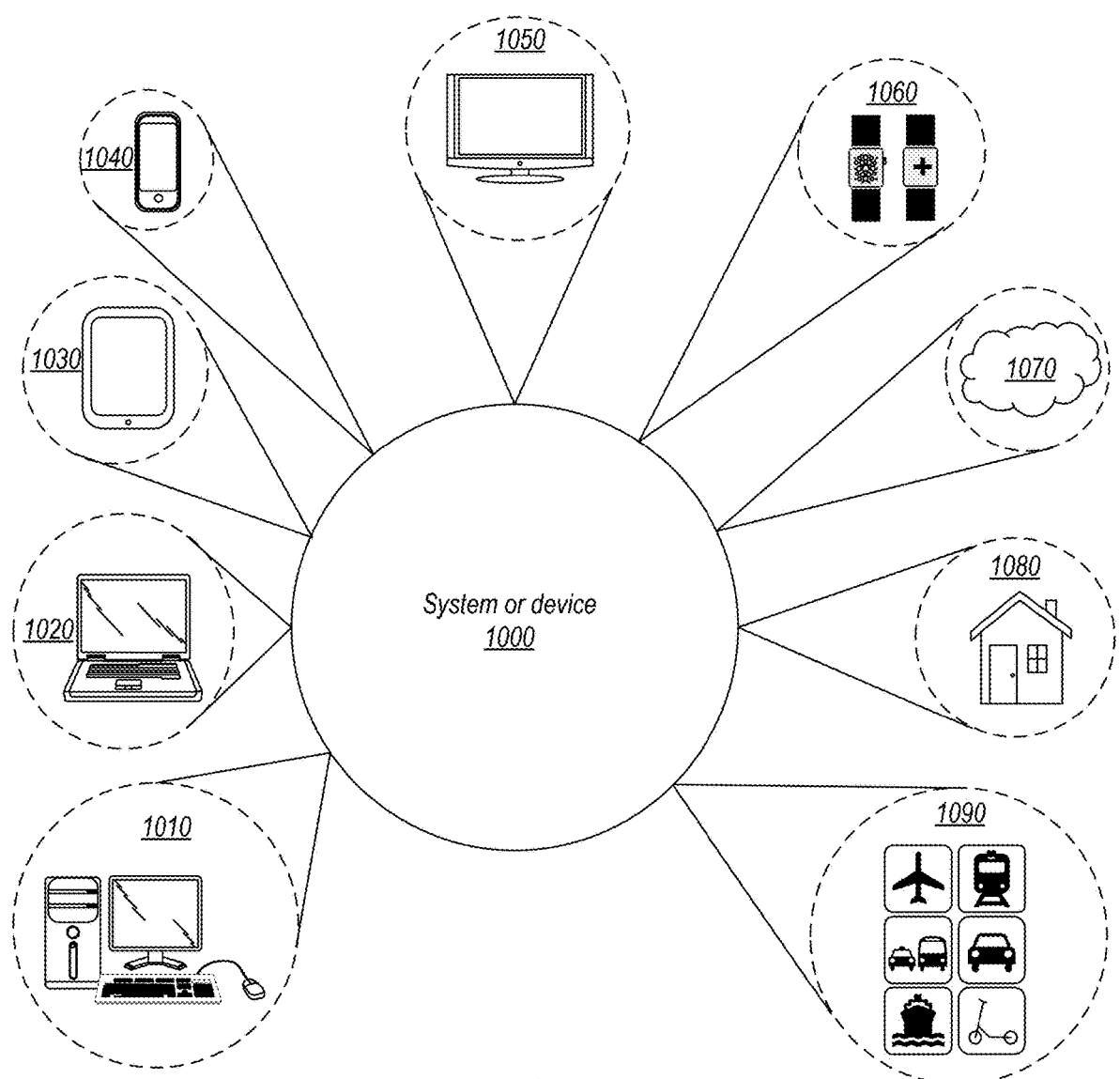
FIG. 10 is a diagram illustrating example applications of disclosed systems and devices, according to some embodiments.

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 11:
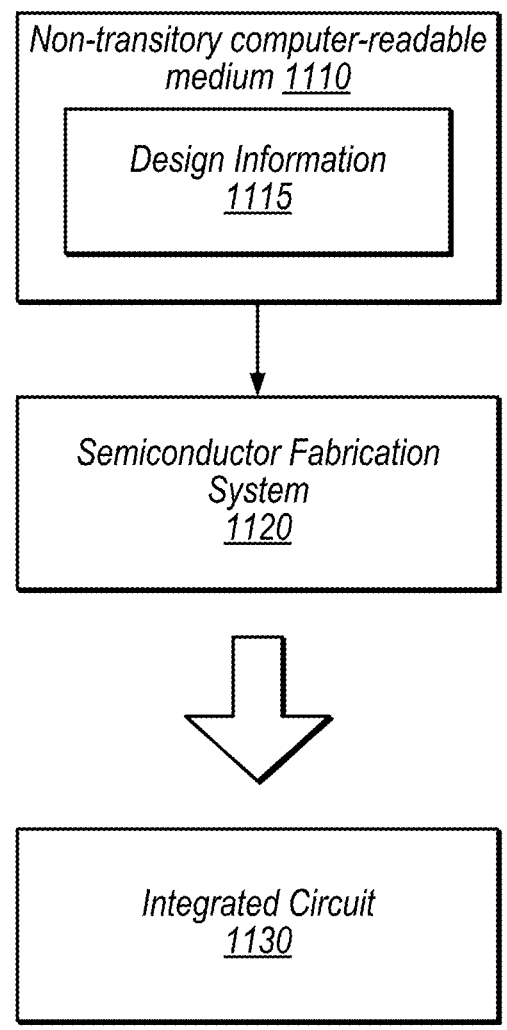
FIG. 11 is a block diagram illustrating an example computer-readable medium that stores circuit design information, according to some embodiments.

FIG. 11 is a block diagram illustrating an example non-transitory computer-readable storage medium that stores circuit design information, according to some embodiments. In the illustrated embodiment semiconductor fabrication system 1120 is configured to process the design information 1115 stored on non-transitory computer-readable medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system 1120. In some embodiments, design information 1115 may also include one or more cell libraries which specify the synthesis, layout, or both of integrated circuit 1130. In some embodiments, the design information is specified in whole or in part in the form of a netlist that specifies cell library elements and their connectivity. Design information 1115, taken alone, may or may not include sufficient information for fabrication of a corresponding integrated circuit. For example, design information 1115 may specify the circuit elements to be fabricated but not their physical layout. In this case, design information 1115 may need to be combined with layout information to actually fabricate the specified circuitry.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown in FIGS. 1 and 10. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:
1. An apparatus, comprising:
  processor circuitry;
  power monitor circuitry configured to generate activity information based on activity of different portions of the processor circuitry during operation of the processor circuitry;
  clock circuitry configured to provide a clock signal to the processor circuitry;
  machine learning circuitry configured to predict a future power state of the processor circuitry based on inputs that include the activity information, wherein the machine learning circuitry:
    is configured to implement a multi-level decision structure that includes nodes at multiple hierarchical levels;
    includes delay stages configured to propagate the activity information from multiple time intervals for the different portions of the processor circuitry, prior to providing the activity information as input to the multi-level decision structure;
    includes mapping circuitry configured to assign respective outputs of the delay stages to node inputs of nodes of the multi-level decision structure; and
    includes node evaluation circuitry configured to process, based on the mapped outputs of the delay stages, nodes from the multiple hierarchical levels of the multi-level decision structure, including to evaluate, at least partially in parallel: whether first delayed activity information from a first delay stage meets a first threshold for a first node in a first level and whether second delayed activity information from a second delay stage meets a second threshold for a second node in a second level; and
  control circuitry configured to, in response to the machine learning circuitry predicting that the future power state of the processor circuitry falls within a set of one or more target predicted power states, control the clock circuitry to reduce a frequency of the clock signal provided to the processor circuitry.

2. The apparatus of claim 1, wherein the set of one or more target predicted power states includes a state that meets a threshold rate-of-change of electrical current.

3. The apparatus of claim 1 wherein the machine learning circuitry is configured to:
  implement multiple different decision trees; and
  select a decision tree from the multiple different decision trees to predict the future power state.

4. The apparatus of claim 3, wherein the control circuitry is configured to:
  categorize a user of the apparatus according to their power usage profile matching, to within a threshold degree, one of multiple power usage profiles;
  wherein the selection of the decision tree from the multiple different decision trees is based on the categorization.

5. The apparatus of claim 1, wherein:
  the multi-level decision structure includes a decision layer and specifies priority information for nodes in the decision layer;
  a given node of the decision layer corresponds to an amount of reduction of the frequency of the clock signal; and
  the control circuitry is configured to, in response to both a first node with a first priority and a second node with a second priority predicting a power state of the processor circuitry that falls within the set of target predicted power states, reduce the frequency of the clock signal according to a node having a greater priority of the first and second nodes.

6. The apparatus of claim 5, wherein the priority information for nodes in the decision layer is stored in programmable circuitry.

7. The apparatus of claim 1, wherein to generate activity information based on activity of different portions of the processor circuitry, the power monitor circuitry is configured to accumulate power event measurements over multiple clock cycles.

8. The apparatus of claim 7, wherein to predict a future power state of the processor circuitry, the machine learning circuitry is configured to determine differences between accumulated power event measurements at multiple different points in time based on the respective outputs of the delay stages.

9. The apparatus of claim 8, wherein the power event measurements include measurements from two or more of the following events:
ray tracing circuit activity;
sampling circuit activity;
branch prediction circuit activity; and
arithmetic logic unit activity.

10. The apparatus of claim 1, wherein the machine learning circuitry is further configured to predict the future power state of the processor circuitry based on machine learning parameters, including one or more node functions and one or more node thresholds, stored in programmable circuitry.

11. The apparatus of claim 1, wherein:
the mapping circuitry is configured to map outputs of the delay stages to node inputs of nodes in the multi-level decision structure based on feature to node mapping information that is stored in programmable circuitry.

12. The apparatus of claim 1, wherein the machine learning circuitry is configured based on a training procedure that includes:
a target training device that includes processor circuitry and power monitor circuitry corresponding in design to the processor circuitry and power monitor circuitry of the apparatus:
providing supply voltage measurements to a training system for use to generate label information; and
providing information indicating the set of power characteristics as training inputs to the training system;
the training system generating a machine learning model, based on the supply voltage measurements and training inputs, wherein the generating utilizes random forest techniques; and
the training system determining configuration parameters for configuring the machine learning circuitry based on the machine learning model.

13. The apparatus of claim 1, wherein the apparatus is a computing device that further includes:
a display;
a central processing unit; and
network interface circuitry.

14. A method, comprising:
generating, by a computing device, activity information based on activity of different portions of a processor circuit during operation of the processor circuit;
providing, by the computing device, a clock signal to the processor circuit;
predicting, by the computing device, a future power state of the processor circuit based on inputs that include the activity information, wherein the predicting includes:
implementing a multi-level decision structure that includes nodes at multiple different hierarchical levels;
propagating, prior to providing the activity information as inputs to the multi-level decision structure, activity information from different time intervals for different portions of the processor circuit using multiple delay stages;
routing respective outputs of the delay stages to node inputs of nodes of the multi-level decision structure; and
processing, based on the routing, nodes from multiple hierarchical levels, including evaluating at least partially in parallel: whether first delayed activity information from a first delay stage meets a first threshold for a first node in a first level and whether second delayed activity information from a second delay stage meets a second threshold for a second node in a second level; and
reducing, by the computing device, in response to predicting that the future power state of the processor circuit falls within a set of one or more target predicted power states, a frequency of the clock signal provided to the processor circuit.

15. The method of claim 14, wherein the set of one or more target predicted power states includes a state that meets a threshold rate-of-change of electrical current.

16. The method of claim 14, further comprising:
selecting, by the computing device, the multi-level decision structure from multiple different multi-level decision structures supported by the computing device.

17. The method of claim 16, further comprising:
categorizing, by the computing device, a user of the computing device according to their power usage profile matching, to within a threshold degree, one of multiple power usage profiles, wherein the selecting is based on the categorizing.

18. The method of claim 14, wherein:
the multi-level decision structure includes a decision layer and specifies priority information for nodes in the decision layer;
a given node of the decision layer corresponds to an amount of reduction of the frequency of the clock signal; and
the method further includes, in response to both a first node with a first priority and a second node with a second priority predicting a power state of the processor circuit that falls within the set of target predicted power states, reducing the frequency of the clock signal according to a node having a greater priority of the first and second nodes.

19. The method of claim 18, further comprising accessing programmable circuitry to determine the priority information for nodes in the decision layer.

\* \* \* \* \*